United States Patent
Tanaka et al.

[11] Patent Number: 5,246,263
[45] Date of Patent: Sep. 21, 1993

[54] REAR BODY STRUCTURE OF VEHICLE

[75] Inventors: Matsuhiro Tanaka; Toshiharu Ikeda; Shuji Muraoka, all of Hiroshima, Japan

[73] Assignee: Mazda Motor Corporation, Hiroshima, Japan

[21] Appl. No.: 820,731

[22] Filed: Jan. 15, 1992

[30] Foreign Application Priority Data

Jan. 18, 1991 [JP] Japan .................................. 3-4381
Feb. 13, 1991 [JP] Japan .................................. 3-5686[U]
Oct. 9, 1991 [JP] Japan .................................. 3-262085

[51] Int. Cl.$^5$ .................................................. B62D 25/08
[52] U.S. Cl. ..................................... 296/189; 296/195
[58] Field of Search ................ 296/189, 195, 198, 203

[56] References Cited

U.S. PATENT DOCUMENTS

| | | | |
|---|---|---|---|
| 2,669,462 | 2/1954 | Toncray et al. | 296/203 X |
| 2,687,325 | 8/1954 | Lindsay | 296/203 |
| 4,684,151 | 8/1987 | Drewek | 296/189 X |
| 4,702,515 | 10/1987 | Kato et al. | 296/189 |
| 4,875,733 | 10/1989 | Chado et al. | 296/195 |
| 4,973,103 | 11/1990 | Imajyo et al. | 296/195 |
| 5,118,160 | 6/1992 | Kitagawa et al. | 296/189 |

FOREIGN PATENT DOCUMENTS

131377 7/1985 Japan ..................................... 296/195

Primary Examiner—David M. Mitchell
Assistant Examiner—Andrew C. Pike
Attorney, Agent, or Firm—Sixbey Friedman Leedom & Ferguson

[57] ABSTRACT

In a rear body structure of a vehicle, a rear pillar forms a rear edge portion of an opening for a door which is formed on one side portion of the vehicle body. A rear fender is connected to the rear pillar and extends rearwardly therefrom. A suspension tower is connected to the rear fender at a distance from the rear pillar. A reinforcement is connected to upper portions of the rear fender and the suspension tower so as to extend in the longitudinal direction of the vehicle body. An impact absorbing portion is provided between the rear pillar and the suspension tower to prevent the rear pillar from being deformed in response to forward displacement of the suspension tower which is caused by a forward impact load acting on the suspension tower.

8 Claims, 10 Drawing Sheets

REAR BODY STRUCTURE OF VEHICLE

BACKGROUND OF THE INVENTION

1. Field of the Invention

This invention relates to a rear body structure of a vehicle.

2. Description of the Prior Art

In a passenger car, there is generally provided a rear fender on a side of the body rearward of a rear pillar, and a suspension tower is connected to the rear fender at a distance from the rear pillar. (See, for instance, Japanese Unexamined Utility Model Publication No. 2(1990)-44578).

In such a rear body structure, a reinforcement is connected to an upper portion of the rear fender so as to extend in the longitudinal direction of the vehicle body in order to increase the strength of the vehicle body around the trunk component. The reinforcement is generally connected to the suspension tower as well as to the rear fender and extends to the rear pillar, and the front end portion of the reinforcement is connected to the rear pillar.

When a vehicle having such a rear body structure collides at the rear, impact load acts on the suspension tower by way of the reinforcement to cause forward displacement of the suspension tower. Since the suspension tower has a downward hollow space for accommodating a suspension strut, the forward displacement of the suspension tower is larger at the top portion of the suspension tower. The displacement of the suspension tower causes a load which urges the rear pillar forward by way of the front end portion of the reinforcement and can cause a forward displacement of the rear pillar.

Further, there has been known a rear body structure for a vehicle in which left and right rear side frames are provided in the rear portion of the passenger compartment and rear wheel housings are provided above the rear side frames. (See, for instance, Japanese Unexamined Utility Model Publication No. 58(1983)-11546). A suspension tower is disposed at the middle of each rear wheel housing and the upper end of a rear suspension for supporting the rear wheel housed in the rear wheel housing is supported by the suspension tower. A quarter panel which forms a part of the passenger compartment is connected to a peripheral portion of the rear wheel housing, and a rear fender panel which forms the outer wall of the vehicle body is disposed spaced outwardly from the quarter panel. The edge portion of the rear fender panel is connected to the quarter panel to form a closed cross section, thereby ensuring rigidity of the rear portion of the vehicle body.

At the portion around the rear fender panel, especially at the upper portion of the wheel arch portion, the cross-sectional area of the closed cross section structure defined by the quarter panel and the rear fender panel can be sufficiently large since the wheel arch portion is positioned closed to the upper edge of the rear fender panel. If the thickness of the rear fender panel and the quarter panel is increased at the portion in order to increase the rigidity, the weight of the vehicle body increases, which is not preferable.

SUMMARY OF THE INVENTION

In view of the foregoing observations and description, a first object of the present invention is to provide a rear body structure which can prevent deformation of the rear pillar which can be caused by a forward displacement of the suspension tower upon collision at the rear of the vehicle.

A second object of the present invention is to provide a rear body structure of a vehicle in which the rigidity of the part around the rear fender can be increased without substantially increasing the weight of the vehicle body.

The first object of the present invention is accomplished by providing an impact absorbing portion or a collapsible portion between the rear pillar and the suspension tower. That is, in accordance with one aspect of the present invention, there is provided a rear body structure of a vehicle comprising a rear pillar which forms a rear edge portion of an opening for a door which is formed on one side portion of the vehicle body, a rear fender which is connected to the rear pillar and extends rearward therefrom, and a suspension tower which is connected to the rear fender at a distance from the rear pillar, and a reinforcement connected to upper portions of the rear fender and the suspension tower so as to extend in the longitudinal direction of the vehicle body, characterized in that an impact absorbing portion is provided between the rear pillar and the suspension tower to prevent the rear pillar from being deformed in response to forward displacement of the suspension tower which is caused by a forward impact load acting on the suspension tower.

For example, the impact absorbing portion may be in the form of a collapsible portion formed in the portion of the reinforcement, which portion extends forward from the suspension tower and is connected to the rear pillar, or in the form of a space between the front end of the reinforcement and the rear pillar which is formed by forming the reinforcement to extend a predetermined distance short of the rear pillar.

With the arrangement described above, a forward impact load acting on the suspension tower is prevented from being transmitted to the rear pillar by virtue of the impact absorbing portion.

The second object of the present invention is accomplished by forming a double closed cross section structure in the wheel arch portion. That is, in accordance with another aspect of the present invention, there is provided a rear body structure of a vehicle comprising a rear pillar of a closed cross section structure which extends in the vertical direction along a rear edge of an opening for a door formed on one side portion of the vehicle body, a vertical wall portion which extends rearward from the rear pillar in the longitudinal direction of the vehicle body above a wheel arch, a belt line reinforcement which is connected to the outer side of the vertical wall portion to form an outer closed cross section structure extending in the longitudinal direction of the vehicle body and is connected to the rear pillar at its front end portion, and a suspension housing reinforcement which is connected to the inner side of the vertical wall portion to form an inner closed cross section structure which is substantially opposed to the outer closed cross section structure in the transverse direction of the vehicle body and extends in the longitudinal direction of the vehicle body, the front end portion of the suspension housing reinforcement being connected to the rear pillar.

With the arrangement described above, a double closed cross section structure extending in the longitudinal direction of the vehicle body is formed by the belt line reinforcement, the vertical wall portion, and the suspension housing reinforcement, whereby the rigidity of the part above the wheel arch having a relatively small cross-sectional area is enhanced. Further, since the front end portions of the belt line reinforcement and the suspension housing reinforcement are connected to the rear pillar and the double closed cross section structure merges into the closed cross section structure of the rear pillar, the whole rear structure is enhanced in its rigidity.

DESCRIPTION OF THE PREFERRED EMBODIMENTS

Figure 1:
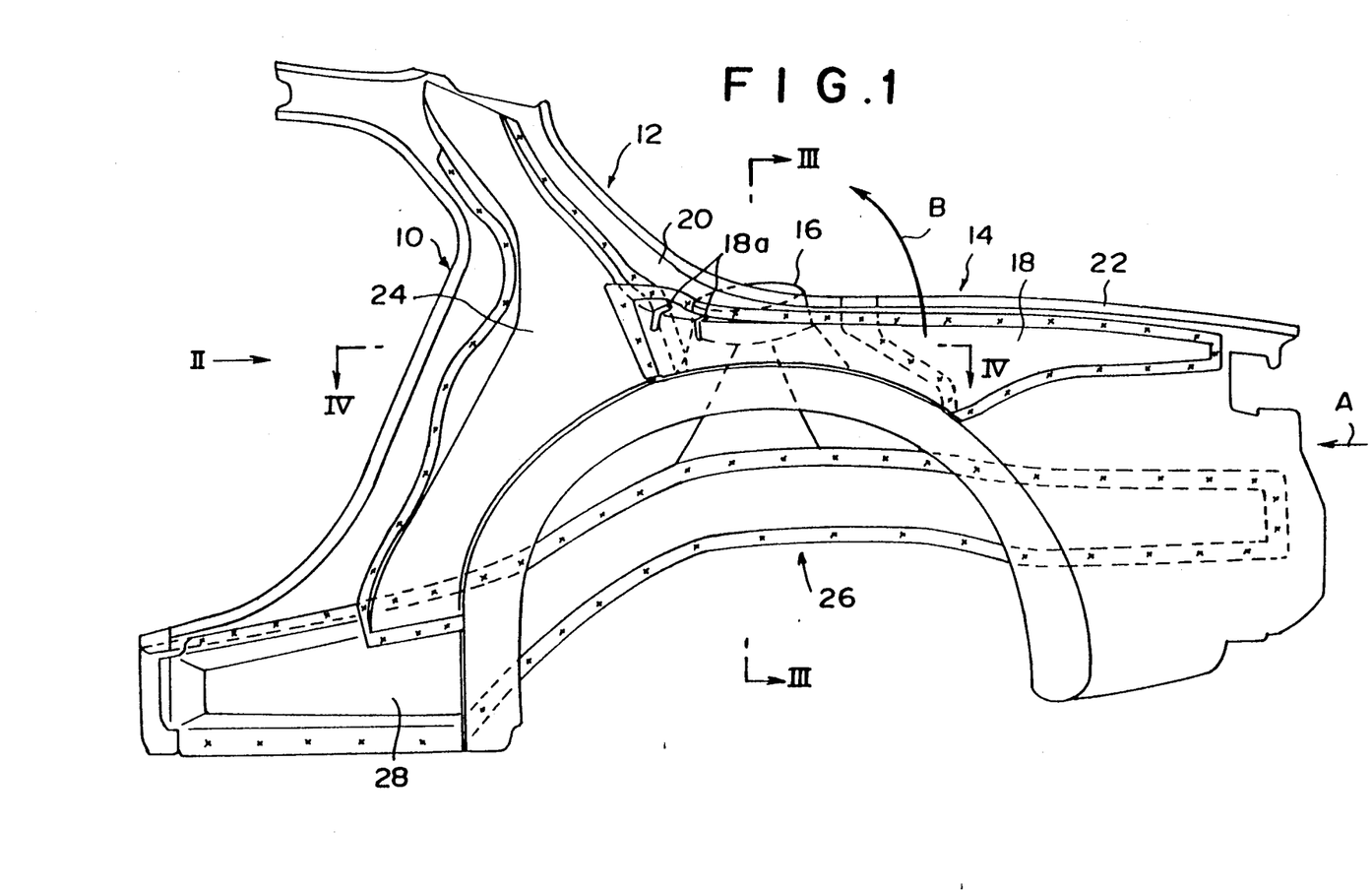
FIG. 1 is a side view showing a rear body structure in accordance with a first embodiment of the present invention.
Figure 2:
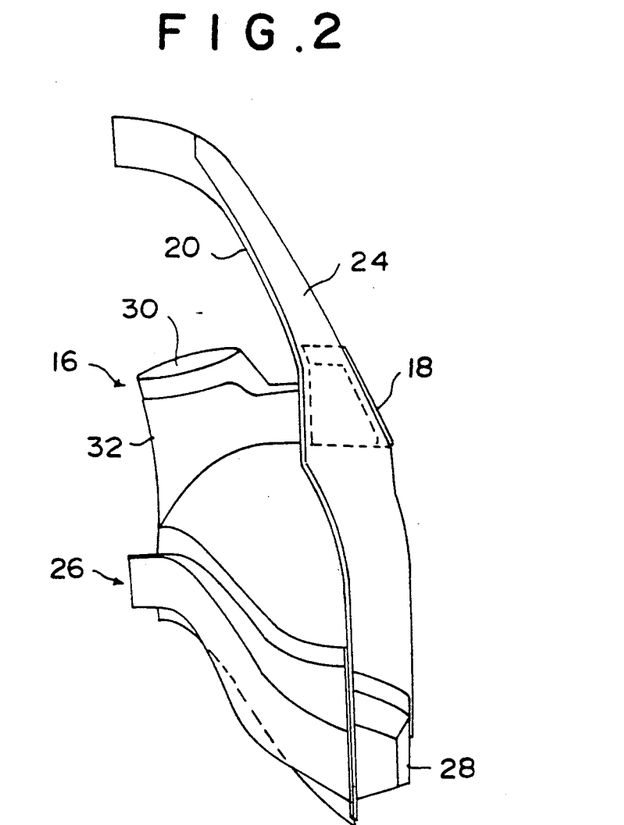
FIG. 2 is a view of the rear body structure as viewed in the direction of arrow II in FIG. 1.

As shown in FIG. 1, the rear body structure of a first embodiment of the present invention comprises a rear pillar 12 which forms a rear edge portion of an opening 10 for a door which is formed on one side portion of a vehicle body, a rear fender 14 which is connected to the rear pillar 12 and extends rearwardly therefrom, and a suspension tower 16 which is connected to the rear fender 14 at a distance from the rear pillar 12, and a rear fender reinforcement 18 connected to upper portions of the rear fender 14 and the suspension tower 16 so as to extend in the longitudinal direction of the vehicle body. Though the rear pillar 12 and the rear fender 14 are respectively formed by inner and outer panels, inner panels 20 and 22 are only shown in FIG. 1.

The inner panel 20 forms the rear pillar 12 and a front part of the rear fender 14, and the inner panel 22 form the other part of the rear fender 14. The rear fender reinforcement 18 extends across the joint line of the inner panels 20 and 22 in the longitudinal direction of the vehicle body and are connected to the inner panels 20 and 22 to form a closed cross section. The front end portion of the rear fender reinforcement 18 extends to a rear pillar reinforcement 24 and is connected thereto.

The rear end portion of the rear fender reinforcement 18 extends near the rear end of the inner panel 22. The rear pillar reinforcement 24 is connected to the inner panel 20 inside the rear pillar 12 to form a closed cross section which extends in the vertical direction. A rear frame 26 is connected to lower portions of the rear pillar 12 and the rear fender 14 to extend in the longitudinal direction of the vehicle body. The rear frame 26 is stepped so that the rear end portion is positioned higher than the front end portion, and the front end portion of the rear frame 26 is connected to a side sill reinforcement 28.

Figure 3:
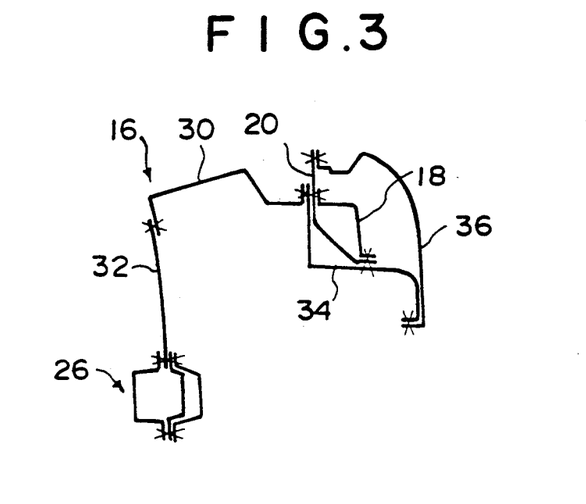
FIG. 3 is a cross-sectional view taken along line III—III in FIG. 1.

As shown in FIG. 3, the suspension tower 16 is formed by upper and lower panels 30 and 32 which are connected together. The upper panel 30 is connected to the inner panel 20 and the rear fender reinforcement 18 by way of a wheel housing panel 34 and the lower panel 32 is connected to the rear frame 26. As can further be seen from FIG. 3, the rear fender reinforcement 18 is connected to upper portions of the rear fender 36 and the suspension tower 16 so as to be positioned at a level below an upper limit of the suspension tower 16. The outer panel 36 of the rear fender 14 is connected to the upper edge of the inner panel 20 and the lower edge of the wheel house panel 34 to form a closed cross section structure.

As shown in FIG. 1, the rear fender reinforcement 18 is provided with a pair of L-shaped recessed beadings 18a (collapsible portions) formed in the upper surface of the corner portion near the front end thereof between the rear pillar reinforcement 24 and the suspension tower 16 to extend in the transverse direction of the vehicle body.

Figure 5:
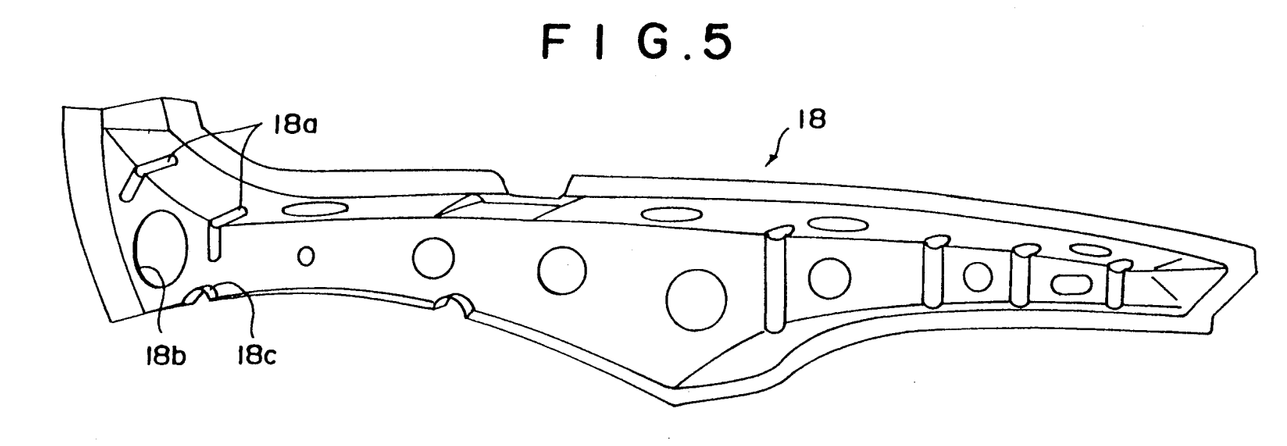
FIG. 5 is a perspective view showing the rear fender reinforcement employed in the rear body structure shown in FIG. 1.

As clearly shown in FIG. 5, the rear fender reinforcement 18 is further provided with an opening 18b formed in the side wall near the front end thereof and with an arcuate beading 18c which is convex upward and is formed in a lower flange portion near the front end thereof.

When the vehicle collides at the rear, an impact load acts forward (in the direction of arrow A in FIG. 1) and is transmitted to the suspension tower 16 by way of the rear frame 26, the rear fender 14, and the rear fender reinforcement 18. Since the suspension tower 16 has a hollow space open downward, the upper portion of the suspension tower 16 is mainly urged forward by the impact load. This tendency is enhanced by the fact that the rear frame 26 is stepped as described above and is urged to rotate upward about the shoulder portion between the rear end portion and the front end portion as shown by the arrow B.

Since the suspension tower 16 and the rear pillar reinforcement 24 are connected in strength by the rear fender reinforcement 18, the rear pillar 12 is generally deformed when the rear pillar reinforcement 24 is displaced or deformed in response to the forward displacement of the suspension tower 16. However, in this embodiment, since the recessed beadings 18a, the collapsible parts, are formed in the rear fender reinforcement 18 near the front end thereof and stress is concentrated to the recessed beading 18a, the rear fender reinforcement 18 buckles at a portion near the beadings 18a, whereby the impact energy is absorbed and deformation of the rear pillar 12 can be prevented. Though the impact load transmitted from the suspension tower 16 includes a component in the direction of arrow B in addition to the component in the direction of arrow A, the recessed beadings 18a are formed in the upper surface of the corner portion of the rear fender reinforcement 18 and accordingly can effectively absorb the impact energy.

Further, in this embodiment, the arcuate beading 18c formed in the lower flange portion of the rear fender reinforcement 18 near the front end thereof as shown in FIG. 5 provides a margin for the lower edge of the rear fender reinforcement 18 to stretch when the beadings 18a are collapsed, whereby the component of the impact load in the direction of arrow B can be effectively absorbed. Further, the opening 18b formed in the side wall portion of the rear fender reinforcement 18 near the front end thereof further facilitates buckling of the rear fender reinforcement 18.

A second embodiment of the present invention will be described hereinbelow.

Figure 4:
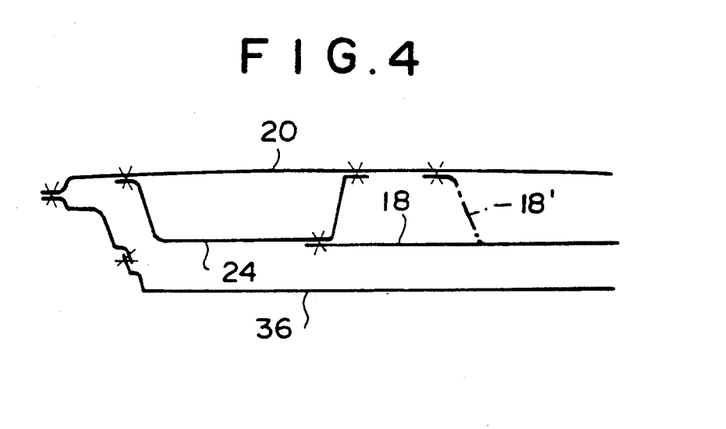
FIG. 4 is a cross-sectional view taken along line IV—IV in FIG. 1.
Figure 6:
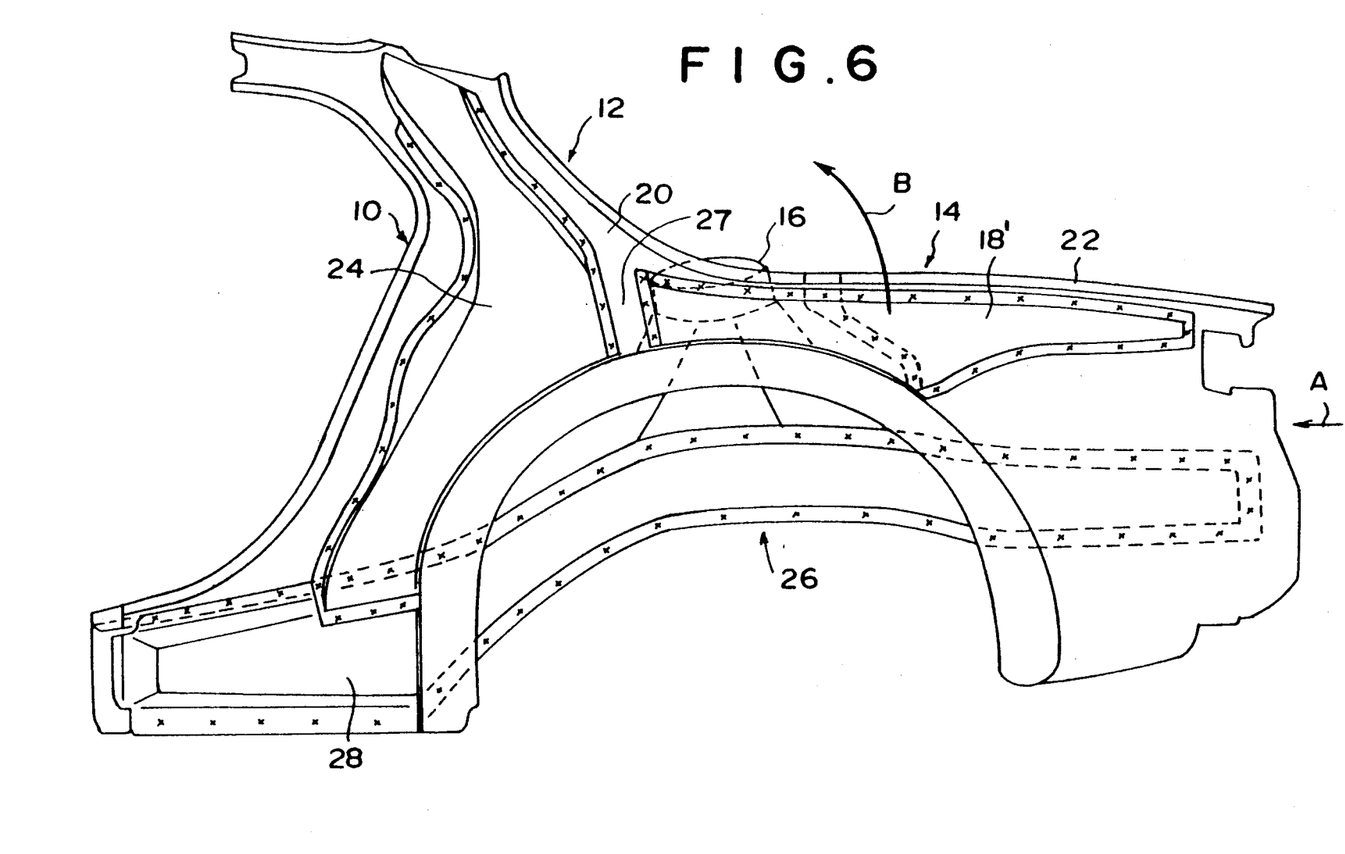
FIG. 6 is a side view showing a rear body structure in accordance with a second embodiment of the present invention.
Figure 7:
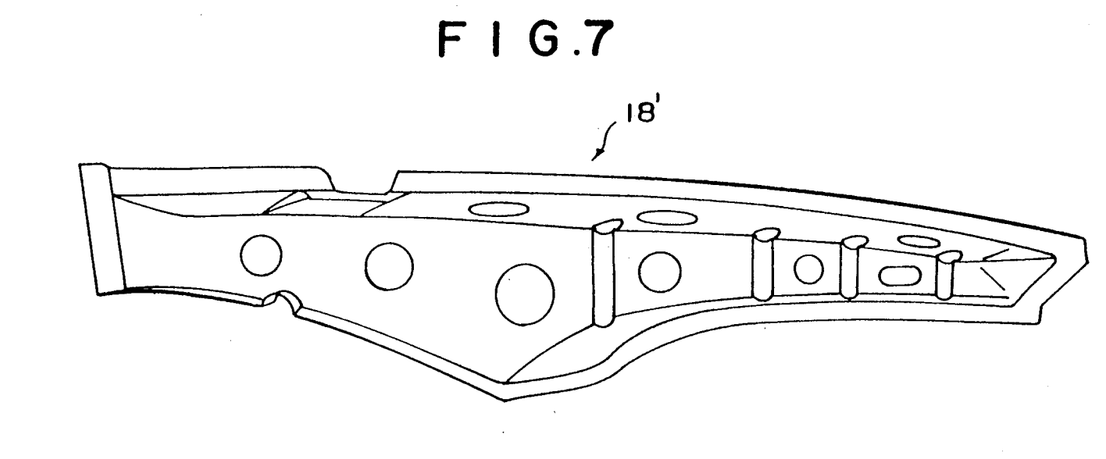
FIG. 7 is a perspective view showing the rear fender reinforcement employed in the rear body structure shown in FIG. 6.

Though, in the first embodiment described above, the front end portion of the rear fender reinforcement 18 extends to the rear pillar reinforcement 24 and is connected to the rear pillar reinforcement 24 and the impact absorbing portion is formed by the recessed beading 18a formed in the rear fender reinforcement 18 between the rear pillar reinforcement 24 and the suspension tower 16, in the second embodiment, the rear fender reinforcement 18′ shown in FIG. 7 is arranged to extend a predetermined distance short from the rear pillar reinforcement 24 as shown in FIG. 6 (and by the chained line in FIG. 4), and the space 27 between the front end of the rear fender reinforcement 18′ and the rear pillar reinforcement 24 forms the impact absorbing portion. In this embodiment, the space 27 prevents deformation of the rear pillar 12 in response to displacement of the suspension tower 16 and the impact energy is absorbed by the rear frame 26 and the like supporting the suspension tower 16.

A third embodiment of the present invention will be described with reference to FIGS. 8 to 13, hereinbelow.

Figure 8:
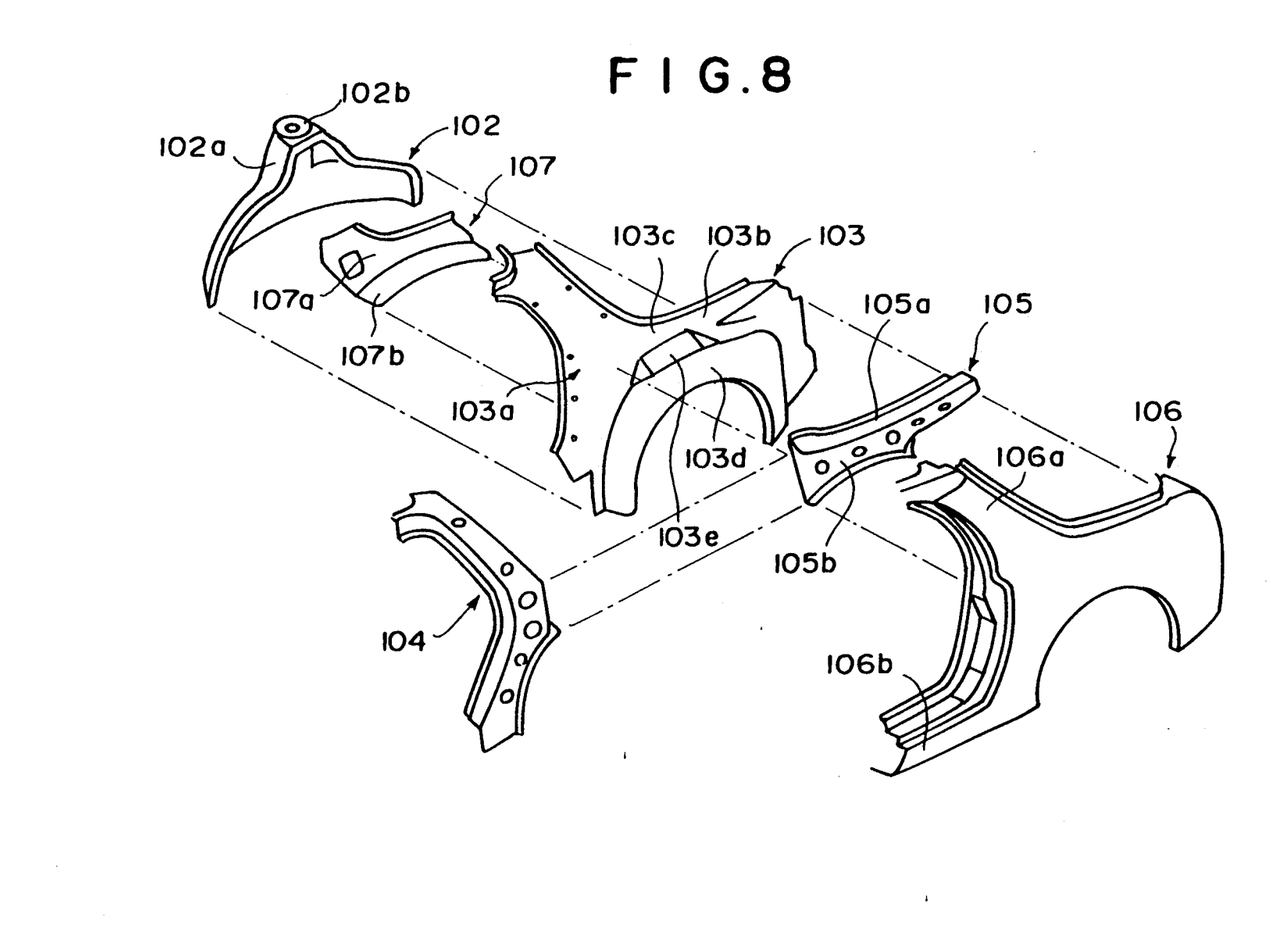
FIG. 8 is an exploded perspective view of a rear body structure in accordance with a third embodiment of the present invention.
Figure 9:
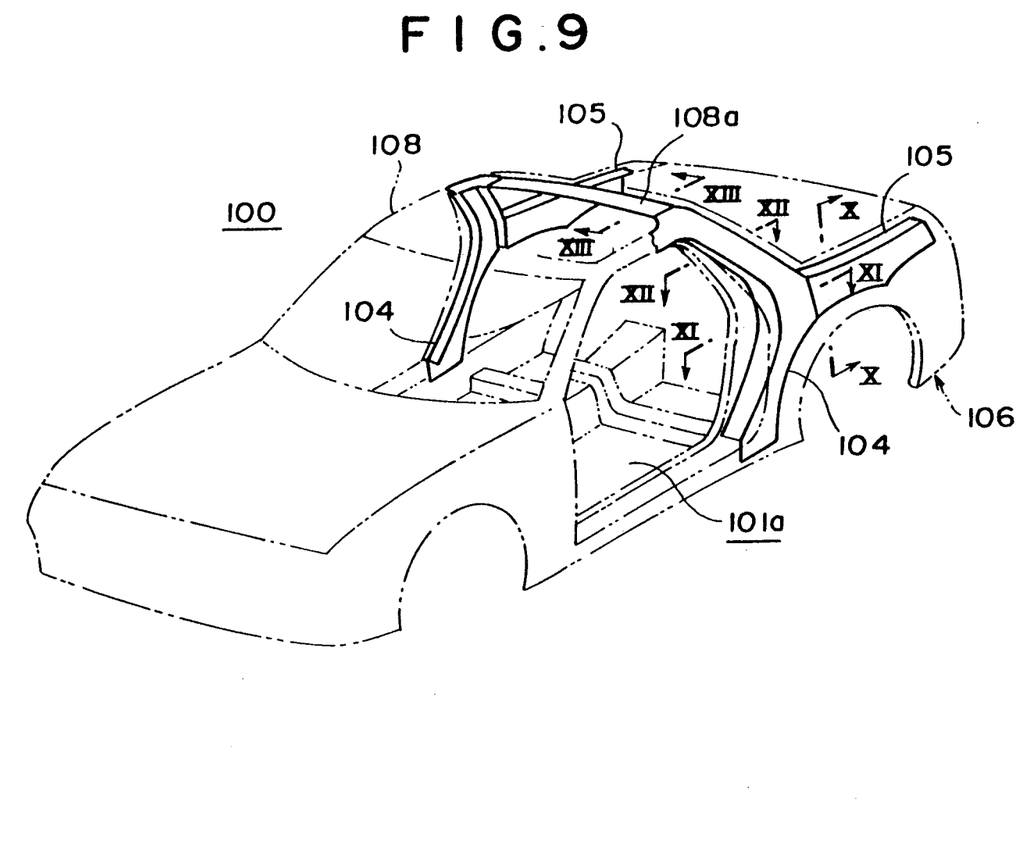
FIG. 9 is a perspective view of the vehicle provided with the rear body structure shown in FIG. 8.

As shown in FIG. 9, the rear body structure in accordance with the third embodiment of the present invention is for a vehicle body 100 of a two-door coupe and panels and frames in the rear body structure are symmetrically arranged about the longitudinal axis of the vehicle body. FIG. 8 is an exploded view of the left part of the rear body structure. The rear body structure of this embodiment comprises a rear wheel housing inner 102, a rear pillar inner 103, a rear pillar reinforcement 104, a belt line reinforcement 105, a rear fender panel 106, and a suspension housing reinforcement 107.

The rear wheel housing inner 102 is connected to the inner side of the rear pillar inner 103 and the rear fender panel 106 and bulges inward to form a space in which a rear wheel (not shown) is accommodated. A suspension tower 102a stands at the middle of the rear wheel housing inner 102. A suspension tower upper 102b is mounted on the top of the suspension tower 102a and supports the upper end of a rear suspension so that upward load from the suspension is received by the suspension tower 102a.

Figure 10:
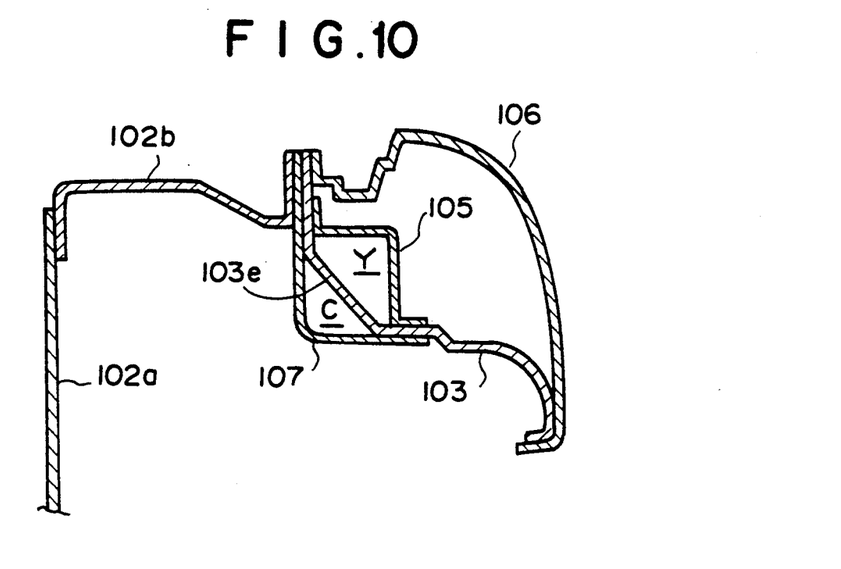
FIG. 10 is a cross-sectional view taken along line X—X in FIG. 9.
Figure 11:
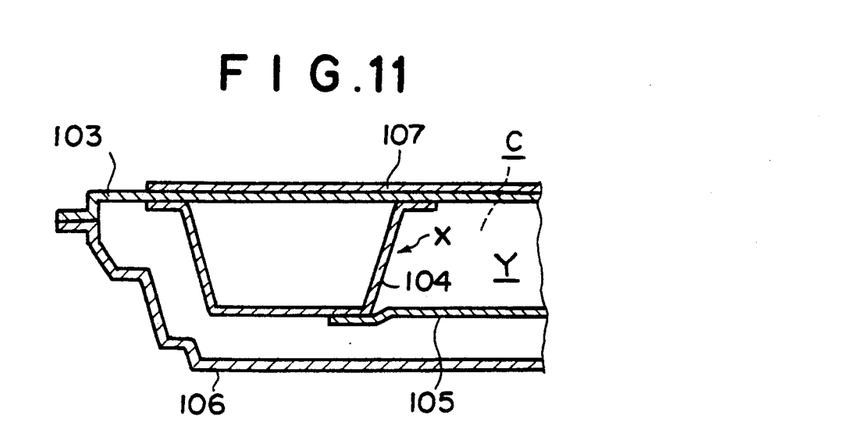
FIG. 11 is a cross-sectional view taken along line XI—XI in FIG. 9.
Figure 12:
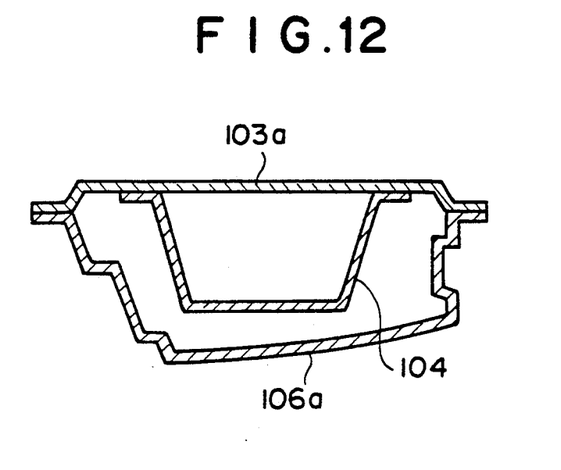
FIG. 12 is a cross-sectional view taken along line XII—XII in FIG. 9.
Figure 13:
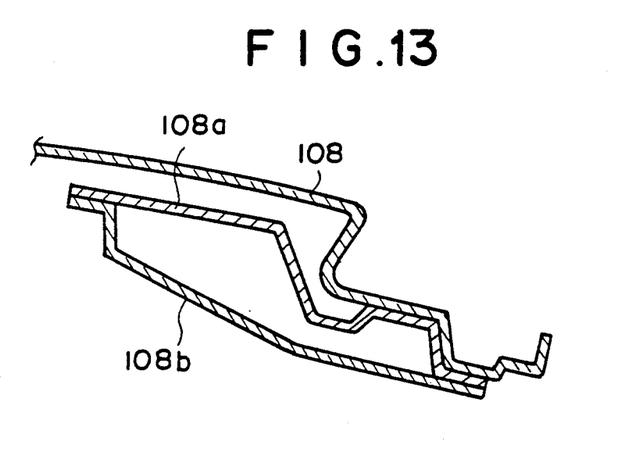
FIG. 13 is a cross-sectional view taken along line XIII—XIII in FIG. 9.

The rear pillar inner 103 comprises a pillar portion 103a which extends in the vertical direction at a portion near the front end of the rear pillar inner 103 and a wheel housing portion 103b which extends rearward from the lower half of the rear end portion of the pillar portion 103a. As shown in FIGS. 11 and 12, the rear pillar reinforcement 104 is connected to the outer side of the pillar portion 103a. The rear pillar reinforcement 104 is similar to the pillar portion 103a in the side view and like a hat in a horizontal cross section. The rear pillar reinforcement 104 has an L-shaped horizontal cross section at a portion opposed to the wheel housing portion 103b, and one end of the portion is connected to a part of the pillar portion 103a near the front end thereof and the other end of the portion is connected to the front end of the wheel housing portion 103b, whereby a rear pillar of a closed cross section structure which extends in the vertical direction along the rear edge of a door opening 101a and enhances the door opening 110a in rigidity is formed. The wheel housing portion 103b forms a vertical wall portion as cited in the claims and comprises a vertical wall portion 103c and a bight portion 103d which projects outward from the lower end of the vertical wall portion 103c. A portion 103e of the joint portion between the vertical wall portion 103c and the bight portion 103d near the top of the bight portion 103d is inclined outward downward. The belt line reinforcement 105 is mounted on the outer side of the rear pillar inner 103 to extend in the longitudinal direction of the vehicle body. The belt line reinforcement 105 is an L-shaped member which comprises a horizontal surface portion 105a and a vertical surface portion 105b extending downward from the outer edge of the horizontal wall portion 105a. A flange which is formed along the inner edge of the horizontal surface portion 105a is connected to the vertical wall portion 103c of the wheel housing portion 103b. A flange which is formed along the lower edge of the vertical surface portion 105b is connected to the bight portion 103d of the wheel housing portion 103b. Thus the belt line reinforcement 105 forms, together with the vertical wall portion 103c and the bight portion 103d of the wheel house portion 103b, a closed cross section structure Y which is substantially rectangular in cross section at parts forward and rearward of the inclined portion 103e and is substantially triangular in cross section at the part of the inclined portion 103e as shown in FIG. 10. The closed cross section structure Y forms the outer closed cross section structure as cited in the claims.

The rear fender panel 106 forms the outer panel of the vehicle body and upper and lower edge portions thereof are respectively connected to the outer side of the upper edge of the rear pillar inner 103 and the lower surface of the lower edge portion of the wheel housing portion 103b of the rear pillar inner 103, thereby forming a closed cross section structure as shown in FIG. 10. The rear fender panel 106 has a rear pillar outer 106a and a side sill outer 106b integrally formed therewith. The rear pillar outer 106a is connected to the outer side of the pillar portion 103a of the rear pillar inner 103 to form a closed cross section structure. The side sill outer 106b is connected to a side sill inner (not shown) to form a closed cross section structure which extends in the longitudinal direction of the vehicle body at the lower portion of the passenger component on each side thereof.

The suspension housing reinforcement 107 comprises a vertical portion 107a and a horizontal portion 107b which extends outward in the transverse direction of the vehicle body from the lower end of the vertical portion 107a. The vertical portion 107a has upper and lower edges the contours of which conform to the shape of the vertical wall portion 103c of the rear pillar inner 103 in a side view. The horizontal portion 107b is curved along the lower edge of the vertical portion 107a and can be mated with the bight portion 103d of the rear pillar inner 103. The vertical portion 107a and the horizontal portion 107b of the suspension housing reinforcement 107 are respectively connected to the inner sides of the vertical wall portion 103c and the bight portion 103d. In the connected state, only the inclined portion 103e of the rear pillar inner 103 is apart from the suspension housing reinforcement 107, whereby a closed cross section structure C which is substantially triangular in cross section is formed by the inclined portion and the suspension housing reinforcement 107 as shown in FIG. 10. This closed cross section structure C forms the inner closed cross section structure as cited in the claims. The front end portions of the vertical portion 107a and the horizontal portion 107b extend near the front end of the rear pillar inner 103 and are positioned inside of the closed cross section structure formed by the rear pillar inner 103 and the rear pillar reinforcement 104 as shown in FIG. 11. That is, the closed cross section structure Y formed by the rear pillar inner 103 and the belt line reinforcement 105 and the closed cross section structure C formed by the rear pillar inner 103 and the suspension housing reinforcement 107 both merge into the closed cross section structure of the rear pillar A formed by the rear pillar inner 103 and the rear pillar reinforcement 104.

At the rear end portion of the roof of the vehicle body, a closed cross section structure extending in the transverse direction of the vehicle body is formed below a roof panel 108 by a rear header upper 108a and the rear header lower 108b. Each end of the rear header upper 8a is connected to the upper end of the rear pillar reinforcement 104 and each end of the rear header lower 108b is connected to the upper end of the pillar portion 103a of the rear pillar inner 103. That is, the closed cross section structure formed by the rear header upper 108a and the rear header lower 108b is connected to the closed cross section structure formed by the rear pillar inner 103 and the rear pillar reinforcement 104.

As can be understood from the description above, the members shown by the solid line in FIG. 9 form a continuous closed cross section structure together with the rear pillar inner 103, thereby ensuring a large rigidity of the rear part of the vehicle body. Especially, the junction of the closed cross section structure, that is, the part about the joint of the belt line reinforcement 105 and the rear pillar reinforcement 104, is enhanced by both the closed cross section structures Y and C which are triangular and are opposed to each other in the transverse direction of the vehicle body, and accordingly has a large rigidity for a small cross-sectional area thereof. Further since the base portion of the rear pillar which extends upward is is exceptionally rigid, the rear pillar and the rear header can function as a roll bar. Further, since the suspension tower 102a and the rear pillar X are connected by way of a double closed cross section structure, the upward load acting on the suspension tower 102a is transmitted to the rear pillar through the double closed cross section structure and then transmitted to the side sill and the roof panel 108. Thus the upward load can be widely dispersed and absorbed.

As described above, in the third embodiment, the wheel arch portion is provided with a double closed cross section structure extending in the longitudinal direction of the vehicle body; the rigidity of the vehicle body at the upper end portion of the wheel arch portion where the cross-sectional area is small can be increased. Further, since the front end portions of the belt line reinforcement 105 and the suspension housing reinforcement 107 are connected to the rear pillar so that the double closed cross section structure merges into the closed cross section structure of the rear pillar, the rigidity of the rear part of the vehicle body can be enhanced without substantially increasing the overall weight of the vehicle body.

Though, in the third embodiment, the present invention is applied to a two-door coupe vehicle body, the present invention can be applied to other various types of vehicle body including a four-door sedan.

What is claimed is:

1. A rear body structure of a vehicle comprising:
   a rear pillar forming a rear edge portion of an opening for a door which is formed on at least one side portion of a vehicle body;
   a rear fender connected to said rear pillar and extending rearwardly from said rear pillar;
   a suspension tower connected to said rear fender and spaced from said rear pillar;
   a rear fender reinforcement member connected to upper portions of said rear fender and said suspension tower and extending in a longitudinal direction of the vehicle body; and
   an impact absorbing means for preventing said rear pillar from being deformed in response to forward displacement of said suspension tower; said impact absorbing means including a recessed beading formed in an upper surface of a forward end portion of said rear fender reinforcement member, forward said suspension tower and an arcuate beading formed in a lower surface of said forward end portion of said rear fender reinforcement member.

2. The rear body structure as defined in claim 1, wherein said rear fender reinforcement member extends to said rear pillar and is connected thereto.

3. The rear body structure as defined in claim 2, wherein a section of said forward end portion of said rear fender reinforcement member is curved upwardly and said recessed beading is formed on the upwardly curved section.

4. The rear body structure as defined in claim 3, wherein at least a portion of said lower surface of said rear fender reinforcement member is arched, in an opposing direction to the upwardly curved section of said rear fender reinforcement member, forming an arched section, and arcuate beading is formed in said arched section.

5. The rear body structure as defined in claim 4, wherein said upper surface of said rear fender reinforcement member includes a plurality of recessed beads and said lower surface of said rear fender reinforcement member includes a plurality of arcuate beads.

6. The rear body structure as defined in claim 5, wherein at least one of said recessed beads and at lest one of said arcuate beads are positioned substantially adjacent one another.

7. The rear body structure as defined in claim 6, in which an opening is formed in said rear fender reinforcement member near the forward end portion thereof.

8. The rear body structure as defined in claim 1, wherein said rear fender reinforcement member is positioned at a level below an upper limit of said suspension tower.

* * * * *